(12) United States Patent
Girardi

(10) Patent No.: US 11,652,503 B2
(45) Date of Patent: May 16, 2023

(54) FULL DUPLEX TRANSCEIVER AMPLIFIER ASSEMBLY, COMMUNICATION SYSTEM INCLUDING SAME, AND ASSOCIATED METHOD

(71) Applicant: WestCom Wireless, Inc, Lower Burrell, PA (US)

(72) Inventor: Frank Girardi, Lower Burrell, PA (US)

(73) Assignee: WESTCOM WIRELESS, INC, Lower Burrell, PA (US)

( * ) Notice: Subject to any disclaimer, the term of this patent is extended or adjusted under 35 U.S.C. 154(b) by 94 days.

(21) Appl. No.: 17/227,548

(22) Filed: Apr. 12, 2021

(65) Prior Publication Data

US 2021/0258035 A1 Aug. 19, 2021

Related U.S. Application Data

(63) Continuation-in-part of application No. 17/120,432, filed on Dec. 14, 2020, now Pat. No. 11,165,551.

(Continued)

(51) Int. Cl.
*H04W 4/00* (2018.01)
*H04B 1/405* (2015.01)
(Continued)

(52) U.S. Cl.
CPC ............. *H04B 1/405* (2013.01); *H04B 1/385* (2013.01); *H04L 5/14* (2013.01); *H04R 1/1041* (2013.01);

(Continued)

(58) Field of Classification Search
CPC .................... H04B 1/405; H04B 1/385; H04B 2001/3866; H04L 5/14; H04R 1/1041;
(Continued)

(56) References Cited

U.S. PATENT DOCUMENTS 6,181,707 B1 1/2001 Erickson et al.
7,082,314 B2 7/2006 Farmer et al.
(Continued)

OTHER PUBLICATIONS

Coach Comm's Tempest and CrewCom/X system products.
P25 Overview; Work Activities of TIA TR-8 Engineering Committee, Mobile and Personal Private Radio Standards.

*Primary Examiner* — Chuong T Ho
(74) *Attorney, Agent, or Firm* — John P. Powers; The Powers IP Law Firm

(57) ABSTRACT

A communication system includes a plurality of full duplex transceiver assemblies each having an ON condition and an OFF condition, and configured to be worn by a different user, each of the plurality of full duplex transceiver assemblies having a housing and printed circuit board coupled to the housing, the printed circuit board including a transceiver having a microprocessor. Each microprocessor is configured to emit a different stream of controlling data when the plurality of full duplex transceiver assemblies are in the ON condition, thereby allowing each of the plurality of full duplex transceiver assemblies to communicate among a plurality of different logical channels. Embedded with each different stream of controlling data is a unique identification number for grouping each of the plurality of full duplex transceiver assemblies together.

20 Claims, 8 Drawing Sheets

Related U.S. Application Data

(60) Provisional application No. 62/956,797, filed on Jan. 3, 2020.

(51) Int. Cl.
*H04R 3/00* (2006.01)
*H04R 1/10* (2006.01)
*H04B 1/3827* (2015.01)
*H04L 5/14* (2006.01)

(52) U.S. Cl.
CPC ....... *H04R 3/00* (2013.01); *H04B 2001/3866* (2013.01); *H04R 2420/07* (2013.01)

(58) Field of Classification Search
CPC ........ H04R 3/00; H04R 2420/07; H04R 1/08; H04R 2201/107
USPC .......................................... 370/329, 330, 328
See application file for complete search history.

(56) References Cited

U.S. PATENT DOCUMENTS

| | | | |
|---|---|---|---|
| 7,187,712 B2 | 3/2007 | Chow et al. | |
| 7,894,371 B2 | 2/2011 | Bonta et al. | |
| 10,455,340 B1* | 10/2019 | Sachs | H04R 29/001 |
| 2002/0196813 A1 | 12/2002 | Chow et al. | |
| 2004/0120391 A1* | 6/2004 | Lin | H04L 5/1423 375/219 |
| 2009/0034432 A1 | 2/2009 | Bonta et al. | |
| 2009/0268642 A1* | 10/2009 | Knox | H04L 12/66 370/277 |
| 2011/0038641 A1* | 2/2011 | Tanaka | H04B 10/564 398/197 |
| 2012/0127973 A1 | 5/2012 | Lin et al. | |
| 2012/0144191 A1* | 6/2012 | Lebovitz | H04L 63/065 713/163 |
| 2012/0182906 A1* | 7/2012 | Knox | H04L 5/14 370/278 |
| 2014/0179327 A1* | 6/2014 | Uwamori | H04W 16/26 455/450 |
| 2017/0034059 A1* | 2/2017 | Annamraju | H04L 65/613 |
| 2017/0324671 A1* | 11/2017 | Zhang | H04L 45/64 |
| 2020/0280829 A1* | 9/2020 | Benefield | H04W 4/46 |
| 2020/0296781 A1 | 9/2020 | Fraser | |
| 2020/0336277 A1 | 10/2020 | Gossiaux et al. | |
| 2020/0351072 A1 | 11/2020 | Khandani | |
| 2021/0104821 A1 | 4/2021 | Gurbuz et al. | |
| 2022/0182713 A1* | 6/2022 | Zhong | H04N 21/43635 |

\* cited by examiner

FULL DUPLEX TRANSCEIVER AMPLIFIER ASSEMBLY, COMMUNICATION SYSTEM INCLUDING SAME, AND ASSOCIATED METHOD

CROSS REFERENCE TO RELATED APPLICATION

This application is a continuation-in-part patent application claiming priority to U.S. patent application Ser. No. 17/120,432, filed Dec. 14, 2020, and entitled "COMMUNICATION SYSTEM, FULL DUPLEX TRANSCEIVER ASSEMBLY AND FULL DUPLEX TRANSCEIVER AMPLIFIER ASSEMBLY THEREFOR, AND ASSOCIATED METHOD," which claims priority to and claims the benefit of U.S. Provisional Patent Application Ser. No. 62/956,797, filed Jan. 3, 2020, the contents of which are incorporated herein by reference.

BACKGROUND OF THE DISCLOSURE

Field of the Disclosure

The present disclosure is related to a communication system. The present disclosure is also related to full duplex transceiver assemblies and full duplex transceiver amplifier assemblies for communication systems. The present disclosure is also related to methods of providing a communication system.

Description of Related Art

Known communication systems that use frequency hopping employ assigned channel hopping in order to provide each device within the system the ability to switch off of a busy channel and onto another channel. For example, different systems may employ algorithms in order to allow a given device to directly jump from one frequency to another. These communication systems had been successful prior to an influx of other devices in the Industrial, Scientific and Medical Radio Band (ISM) frequencies. While the instant disclosed concept is not limited to any particular communication setting, comparisons may be made to systems in the amateur and professional sports contexts, wherein devices typically operate in congested frequencies. In these contexts, the influx of devices (e.g., cordless phones, sideline replay systems, wireless scoreboards, WiFi, and wireless intercoms) near (e.g., or in in the same stadium during a contest) coaches and other personnel using communication equipment has complicated their ability to move between frequencies.

Furthermore, using assigned channel hopping has become significantly harder to provide clear and interference free communications when a large number of devices are paired together (e.g., when multiple coaches on a single team are paired together), or when multiple groups are within the same area of operation. For example, because of the interference that occurs when multiple devices are hopping between frequencies, it is common in known systems for different groups to be restricted to different frequencies. During a football game, for example, this may present as one team's communication system (e.g., communication equipment for head coach one, offensive coordinator one, special teams coordinator one, etc.) being assigned and restricted to ISM frequencies 902-915 Mhz during the contest, while the other team's communication system (e.g., communication equipment for head coach two, offensive coordinator two, special teams coordinator two, etc.) is assigned and restricted to ISM frequencies 916-928 Mhz during the contest. This undesirably restricts the ability of, in the sport's arena, coaches and personnel to communicate with one another over the entire ISM spectrum. Specifically, changing physical channels in a busy frequency spectrum often results in devices moving among other devices occupying the same frequencies, thus generating a "popping" sound (e.g., caused by a lengthy amount of time associated with moving from frequency to frequency) that is able to be heard by all devices on a given frequency.

In the multi-billion dollar a year National Football League (NFL) industry, for example, coaches use communication devices to communicate from coaches in the press box to coaches on the field, amongst each other, and to communicate with players, who might have a miniature receiver in his or her helmet. The best solution for the NFL in today's art is to have a plurality of devices worn on the coach in order to allow for this type of communication. FIGS. 1 and 2 show current prior art views of a communication unit 2 that is typically worn by a football coach during an NFL game. As shown, the unit 2 includes a full duplex transceiver 10 to allow the coach to communicate with other coaches, a walkie talkie 20 in order to enable the coach to communicate with a player on the field, an interface device 30 in order to mate the walkie talkie 20 with the full duplex transceiver 10, a router (shown but not labeled) to assist with connecting the coach to other coaches, and an array of antennas (not shown) needed to be placed near the coaches on the field. This array of antennas (not shown) is provided so that the transceivers associated with a given team will capture the frequency with more power and communicate with each other without talking over other transceivers (e.g., of another team). The proximity to the antennas enables the transceivers for that specific team to do this.

Accordingly, it will be appreciated that this is an excessively large number of devices that each coach must carry on their belt, requiring wasteful time to assemble, complicating their ability to coach, as well as move around the sidelines. Additionally, having such a large number of devices increases the cost of the unit per coach. Furthermore, because of the frequency congestion, two days prior to an NFL game, it is common for a team of engineers to be required to arrive at a stadium and sweep to determine if there are other devices that would interfere with headsets being used for the upcoming game. If other devices are found in the stadium, they are marked and must be turned off during the game in order to prevent interference.

Another drawback with known communication systems pertains to single data distribution (SDD). Specifically, known communication systems that employ a plurality of paired devices (e.g., in a football context, a head coach's communication devices, an offensive coordinator's communication devices, and a special teams' coordinator's communication devices, and all the other coaches that make up the coaching staff) typically have one device (e.g., one of the head coach's communication devices) set up as the SDD device which sends frequency hopping sequences to all of the other paired devices. Accordingly, while all of the paired devices are turned on and communicating with one another, this SDD device instructs each of the remaining devices in the group when and what channel to switch to. However, with today's art, if this SDD device were to fail for any reason, all of the remaining devices in the paired group will no longer be instructed what frequencies to switch to, thereby undesirably ending communication between the remaining devices Eliminating a single point of failure with today's methods would require excessively large amounts of equipment, as well as down time for the excessive equipment to turn on and establish a sync method for the remaining paired devices to follow, once the SDD device has failed.

For at least the foregoing reasons, an improved communication system, full duplex transceiver assembly and full duplex transceiver amplifier assembly therefor, and associated method are provided herein.

SUMMARY

In accordance with one aspect of the disclosed concept, a communication system includes a plurality of full duplex transceiver assemblies each having an ON condition and an OFF condition, and configured to be worn by a different user, each of the plurality of full duplex transceiver assemblies having a housing and printed circuit board coupled to the housing, the printed circuit board including a transceiver having a microprocessor. Each microprocessor is configured to emit a different stream of controlling data when the plurality of full duplex transceiver assemblies are in the ON condition, thereby allowing each of the plurality of full duplex transceiver assemblies to communicate among a plurality of different logical channels. Embedded with each different stream of controlling data is a unique identification number for grouping each of the plurality of full duplex transceiver assemblies together.

In accordance with another aspect of the disclosed concept, a full duplex transceiver assembly includes a housing, and a printed circuit board coupled to the housing, the printed circuit board comprising a transceiver having a microprocessor. The microprocessor is configured to emit a stream of controlling data when the full duplex transceiver assembly is in an ON condition, thereby allowing the full duplex transceiver assembly to communicate among a plurality of different logical channels with a plurality of other full duplex transceiver assemblies. Embedded within the steam of controlling data is a unique identification number for grouping the full duplex transceiver assembly and the plurality of other full duplex transceiver assemblies together.

In accordance with another aspect of the disclosed concept, a full duplex transceiver amplifier assembly includes a housing, a bi-directional microphone coupled to the housing, a printed circuit board coupled to and disposed within the housing, the printed circuit board comprising a transceiver having a microprocessor, and a bi-directional amplifier, and a speaker electrically connected to the printed circuit board, the amplifier being electrically connected to the microphone, the speaker and the transceiver. The microprocessor is configured to emit a delayed controlling stream of data, thereby allowing audio to pass between the transceiver and the amplifier without feedback, regardless of the amplification level and the proximity of the microphone to the speaker.

In accordance with a further aspect of the disclosed concept, a method of providing a communication system includes the steps of providing a plurality of full duplex transceiver assemblies each having an ON condition and an OFF condition, and configured to be worn by a different user, each of the plurality of full duplex transceiver assemblies comprising a housing and printed circuit board coupled to the housing, the printed circuit board having a transceiver having a microprocessor, emitting a different stream of controlling data with the microprocessor of each of the plurality of full duplex transceiver assemblies when the plurality of full duplex transceiver assemblies are in the ON condition, thereby allowing each of the plurality of full duplex transceiver assemblies to communicate among a plurality of different logical channels, and embedding with each different stream of controlling data a unique identification number for grouping each of the plurality of full duplex transceiver assemblies together.

BRIEF DESCRIPTION OF THE DRAWINGS

The above-mentioned and other features and advantages of this disclosure, and the manner of attaining them, will become more apparent and the disclosure itself will be better understood by reference to the following descriptions of embodiments of the disclosure taken in conjunction with the accompanying drawings, wherein.

Corresponding reference characters indicate corresponding parts throughout the several views. The exemplifications set out herein illustrate exemplary aspects of the disclosure, and such exemplifications are not to be construed as limiting the scope of the disclosure in any manner.

DETAILED DESCRIPTION OF THE DISCLOSURE

The following description is provided to enable those skilled in the art to make and use the described embodiments contemplated for carrying out the concept. Various modifications, equivalents, variations, and alternatives, however, will remain readily apparent to those skilled in the art. Any and all such modifications, variations, equivalents, and alternatives are intended to fall within the spirit and scope of the present concept.

As employed herein, the term "number" shall mean one or an integer greater than one (e.g., a plurality).

As employed herein, the term "coupled" shall mean connected together either directly or via one or more intermediate parts or components.

As employed herein, the term "logical channel" shall mean a communication channel provided by a scaled stream of controlling, advisory, and functional data which is emitted into the RF stream by a microprocessor. In prior art systems, when two transceivers are both on a given fixed frequency, they communicate freely with one another on a channel. On "logical channels", in accordance with the disclosed concept and by way of contrast, the communication channels have digital information embedded in the emitted stream of controlling data, digital information which is passed through a single fixed frequency, thereby allowing multiple transceivers, devices, and functions to operate on that single frequency.

Figure 3:
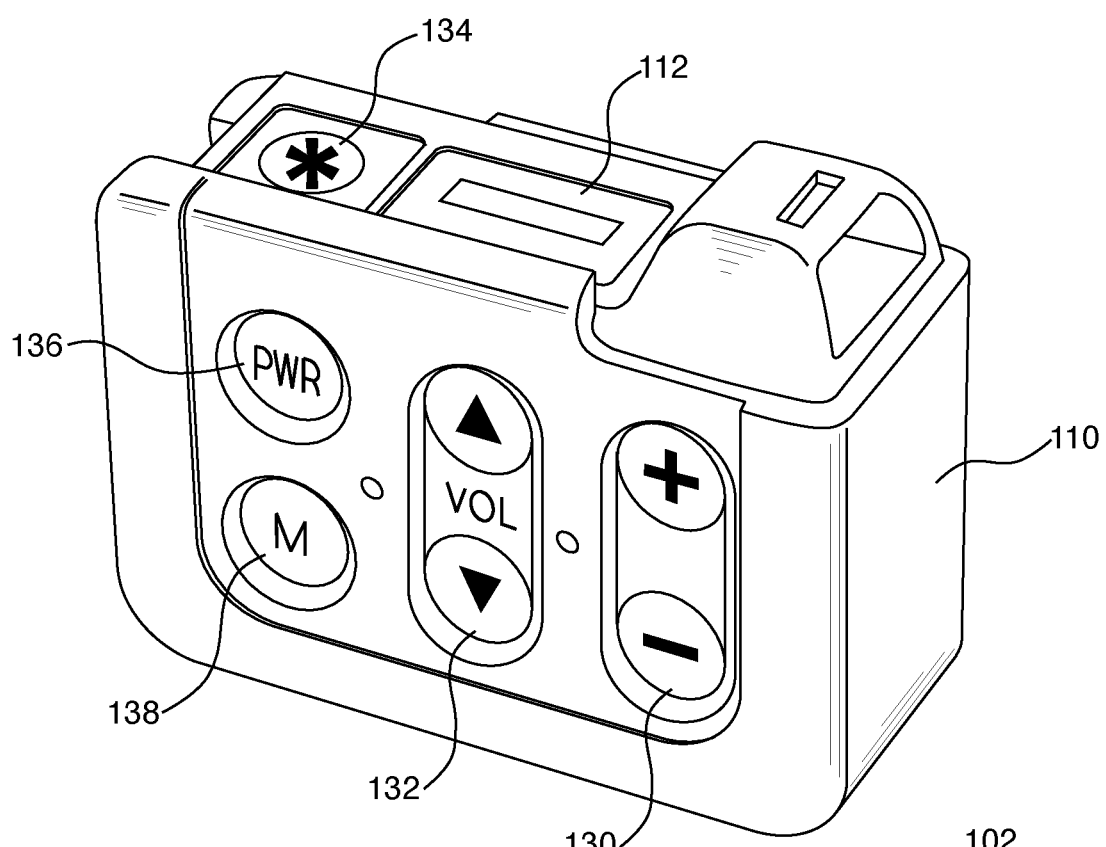
FIG. 3 is an isometric view of a full duplex transceiver assembly for a communication system, in accordance with one non-limiting embodiment of the disclosed concept.
Figure 4:
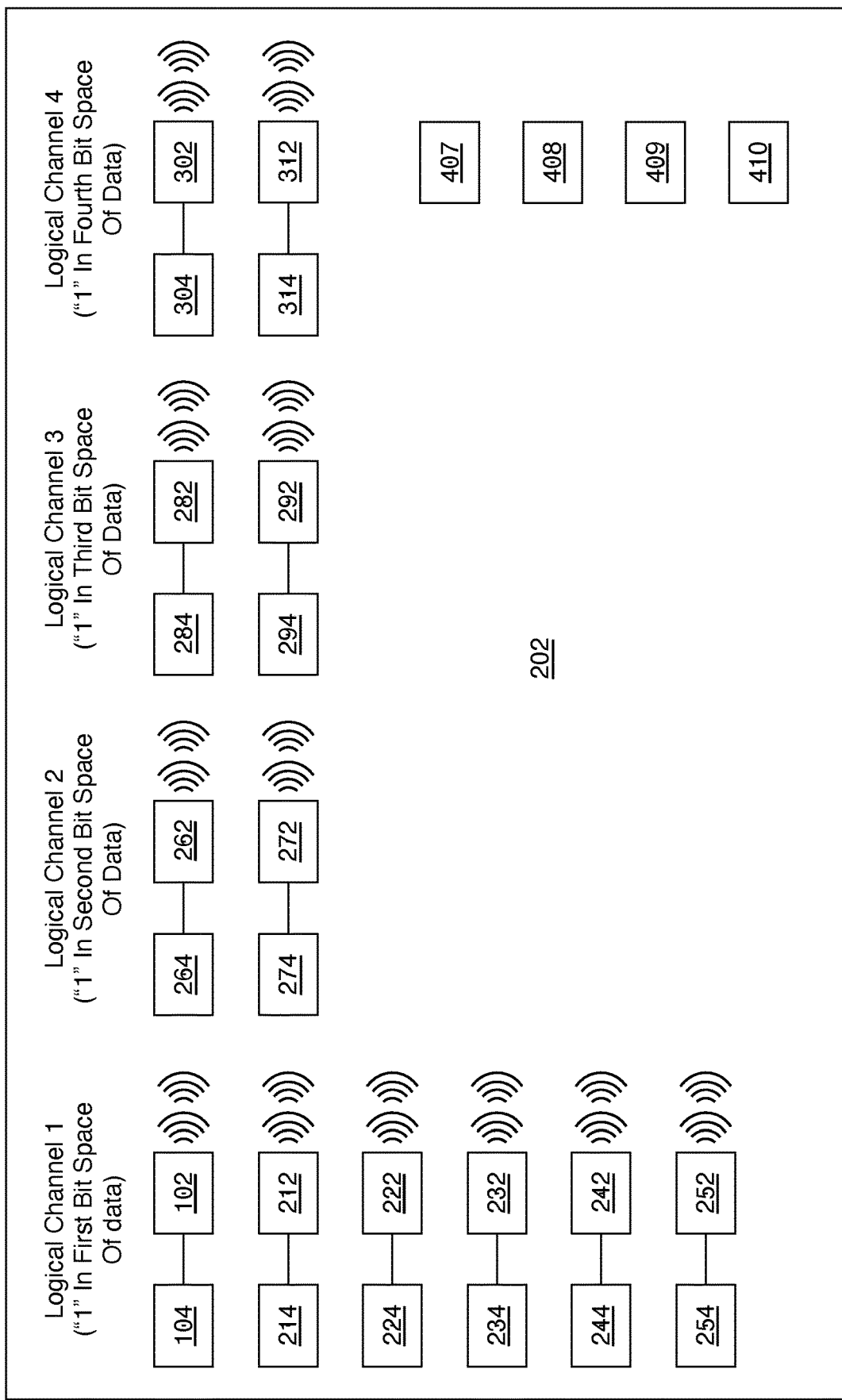
FIG. 4 is a simplified view of a communication system employing the full duplex transceiver assembly of FIG. 3, in accordance with one non-limiting embodiment of the disclosed concept.

FIG. 3 is an isometric view of a full duplex transceiver assembly 102 for a communication system, e.g., communication system 202, shown in simplified form in FIG. 4 wherein 102, 212, 222, 232, 242, 252, 262, 272, 282, 292, 302, and 312 represent full duplex transceiver assemblies, each structured similar to or the same as the full duplex transceiver assembly 102; and 104, 214, 224, 234, 244, 254, 264, 274, 284, 294, 304, and 314 represent headsets that are directly connected with the corresponding full duplex transceiver assemblies. It will be appreciated that each user (e.g., an NFL coach, a firefighter, an airline worker, and/or anyone who requires hands free full duplex communication) within a communication system as disclosed herein, is advantageously configured to be associated with, or, to wear, a single full duplex transceiver assembly and headset. As will be discussed in greater detail below, among other benefits, employing the full duplex transceiver assembly 102 in a communication system such as the communication system 202 significantly improves the ability of communication to occur without interruption, advantageously reduces the amount of equipment needed to be worn in, for example, an NFL contest, and eliminates the need for sweeps to be made in stadiums by teams of engineers before contests. As shown, the full duplex transceiver assembly 102 has a digital display 112, channel adjustment buttons 130, volume adjustment buttons 132, a push to talk button 134, a power button 136, a menu button 138, and a cable controlled voltage feature with its voltage output terminated on two of the six pins located at the microphone connection jack (not shown).

Figure 1:
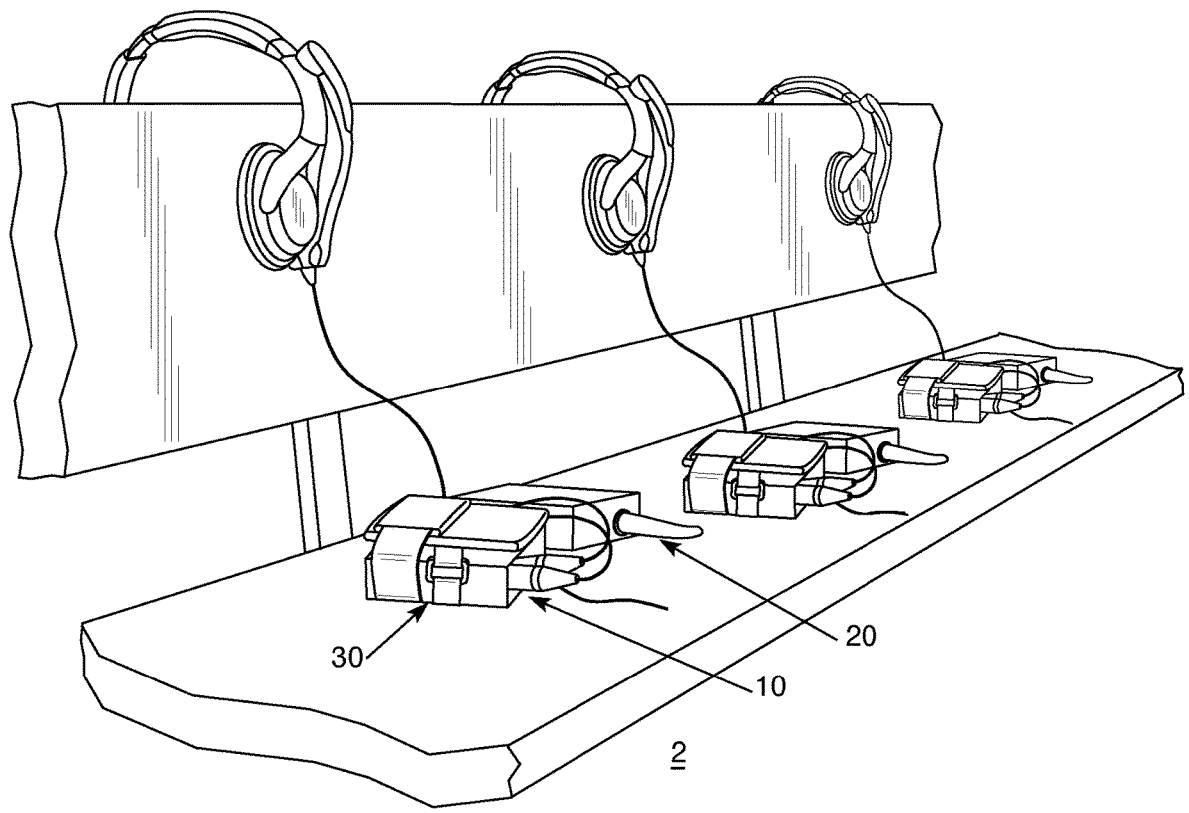
FIGS. 1 and 2 are different views of a prior art unit for a communication system used by coaches in the NFL.
Figure 2:
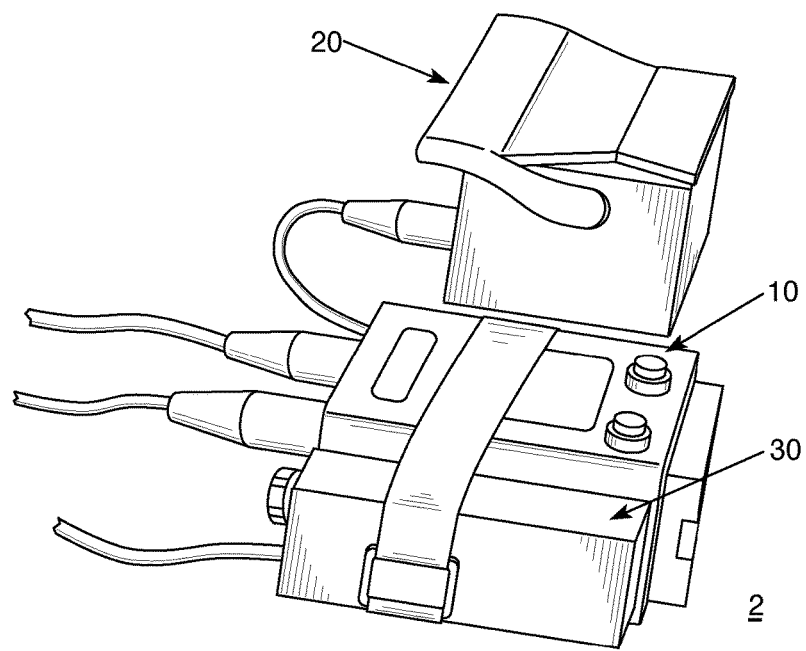

The digital display 112 is configured to display to a user which channel they are on. The channel adjustment buttons 130 of each of the full duplex transceiver assemblies 102, 212, 222, 232, 242, 252, 262, 272, 282, 292, 302, and 312 are electrically connected to a respective microprocessor, and responsive to pushing one of the channel adjustment buttons 130, the full duplex transceiver assemblies 102, 212, 222, 232, 242, 252, 262, 272, 282, 292, 302, and 312 are caused to move among a plurality of logical channels. For example, in the football context, a head football coach desiring to talk to the offensive coordinator might, for example and without limitation, press the channel button until the digital display reads "OFFENSE," and a customized audible "OFFENSE" is heard in the associated headset. Additionally, by pressing the up and down volume adjustment buttons 132, the volume in a corresponding headset attached to the full duplex transceiver assembly is advantageously able to be adjusted. The push to talk button 134 provides a simple mechanism by which, as will be discussed below, communication can be had with, for example, a player on a football field, without the need for a separate communication device and associated equipment (e.g., the walkie talkie 20, interface device 30, and router showed in FIGS. 1 and 2). The push to talk button 134 also serves as the method to allow the controlled voltage to appear on two of the six pins of the microphone connector, or also serve as the mechanism to communicate if the full duplex transceiver assembly 102 is programmed as push to talk instead of full duplex (e.g., talk openly). The power button 136 allows a user to turn the full duplex transceiver assembly on and off, and serve as a method to view the status of the full duplex transceiver assembly 102, such as a battery indicator, User ID, and other devices within the group on the same logical channel. The menu button 138 advantageously functions to mute audio (e.g., if a user presses the button 138, other full duplex transceiver assemblies cannot hear audio from that user), adjust the brightness of the digital display 112, adjust microphone loudness from a user, and allow for a new full duplex transceiver assembly to be programmed to function in a communication system, such as system 202 by providing a pairing method (with a unique pairing code associated with that group of full duplex transceiver assemblies) and user ID assignment). Regarding pairing and user ID assignment, pressing the menu button 138 assigns a user ID to that new full duplex transceiver assembly. Subsequently, pressing the push to talk button 134 will wirelessly pair the full duplex transceiver assembly to other full duplex transceiver assemblies within the system, and will take encryption from other full duplex transceiver assemblies and pair it into the new full duplex transceiver assembly The cable controlled voltage feature provides a further advantageous function of allowing the user of the full duplex transceiver assembly 102 to energize distant equipment. As will be discussed below, this has benefits in other industries, such as the airline industry. This function is selectable in either a momentary voltage or latched voltage output.

Figure 5:
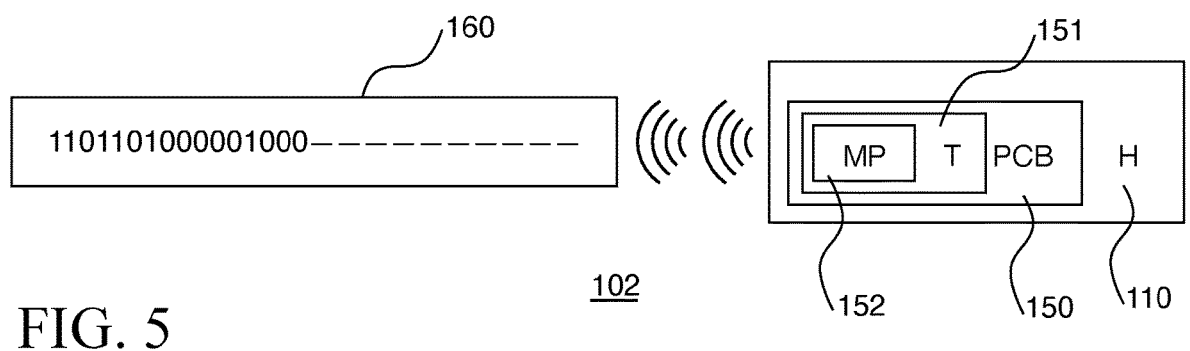
FIG. 5 is a simplified view of the full duplex transceiver assembly of FIG. 3, and shown with a portion of the housing removed in order to see hidden structures.

FIG. 5 is a simplified view of the full duplex transceiver assembly 102 of FIG. 3, and shown with a portion of the housing 110 removed. As shown, coupled to the inside of the housing 110 is a printed circuit board 150. The printed circuit board 150 includes a transceiver 151 having a microprocessor 152. Each of the full duplex transceiver assemblies 102, 212, 222, 232, 242, 252, 262, 272, 282, 292, 302, and 312 has an ON condition and an OFF condition, and when in the ON condition, the microprocessors 152 are each configured to actively emit a number of different streams of identical controlling data 160 consisting of a binary sequence of numbers, thereby allowing each of the plurality of full duplex transceiver assemblies 102, 212, 222, 232, 242, 252, 262, 272, 282, 292, 302, and 312 to communicate among a plurality of different logical channels. The number of different streams of identical controlling data 160 emitted by the microprocessor 152 of the full duplex transceiver assembly 102 are also each different than the number of streams of identical controlling data being emitted by all of the other corresponding microprocessors in the communication system 202, for reasons that will be discussed below. Additionally, it will be appreciated that each of the full duplex transceiver assemblies 102, 212, 222, 232, 242, 252, 262, 272, 282, 292, 302, and 312 is configured to receive the different streams of controlling data of all of the other full duplex transceiver assemblies 102, 212, 222, 232, 242, 252, 262, 272, 282, 292, 302, and 312 at the same time. In one example embodiment, the data is 256 bits long. This data 160 (e.g., and the data from the other full duplex transceiver assemblies) provides a novel mechanism by which the full duplex transceiver assemblies 102, 212, 222, 232, 242, 252, 262, 272, 282, 292, 302, and 312 can communicate with each other. In the example of FIG. 4, the wireless communication symbols represent data that is being emitted by the microprocessors of each of the full duplex transceiver assemblies 102, 212, 222, 232, 242, 252, 262, 272, 282, 292, 302, and 312.

In order for the full duplex transceiver assemblies 102, 212, 222, 232, 242, 252, 262, 272, 282, 292, 302, and 312 to communicate with each other, embedded within each different stream of controlling data 160 (e.g., and the data from the other full duplex transceiver assemblies) that they are emitting is a unique identification number for grouping each of the plurality of full duplex transceiver assemblies 102, 212, 222, 232, 242, 252, 262, 272, 282, 292, 302, and 312 together. Stated differently, in the example of FIG. 4, each of the full duplex transceiver assemblies 102, 212, 222, 232, 242, 252, 262, 272, 282, 292, 302, and 312 is emitting a different unique identification number, which functions to group all of the full duplex transceiver assemblies 102, 212, 222, 232, 242, 252, 262, 272, 282, 292, 302, and 312 together. Additionally, all of the full duplex transceiver assemblies 102, 212, 222, 232, 242, 252, 262, 272, 282, 292, 302, and 312, by having an identification number, know the exact frequency sequence for precise uninterrupted hopping within the group. Furthermore, within the data 160 (e.g., and the data from the other full duplex transceiver assemblies), information (e.g., audio and control information) is sent from transceiver to transceiver, thereby allowing for multiple functions to be performed, and also preventing the auxiliary functions of the full duplex transceiver assemblies from being interrupted by other devices sharing the same physical channel within the communication system 202.

Rather than being passed on a physical channel, the information is passed using the data 160 (e.g., and the data from the other full duplex transceiver assemblies). Stated differently, employing the disclosed method allows all the full duplex transceiver assemblies 102, 212, 222, 232, 242, 252, 262, 272, 282, 292, 302, and 312 within the communication system 202 to be linked together and exchange data amongst themselves. As each of the full duplex transceiver assemblies 102, 212, 222, 232, 242, 252, 262, 272, 282, 292, 302, and 312 emit data that may be 256 bits long, it follows that each of the full duplex transceiver assemblies 102, 212, 222, 232, 242, 252, 262, 272, 282, 292, 302, and 312 may have 256 corresponding logical channels. In turn, the full duplex transceiver assemblies 102, 212, 222, 232, 242, 252, 262, 272, 282, 292, 302, and 312 that are together on one of the 256 logical channels are actually on the same physical channel. For example, and continuing to refer to FIG. 5, if the users of full duplex transceiver assemblies 102 and 212 each have a "1" as the fourth number in their data 160, both full duplex transceiver assemblies 102 and 212 can communicate on that channel. In the example embodiment, the first six logical channels represent channels on which users can communicate in full duplex (e.g., openly talk to each other). With respect to the full duplex transceiver assembly 102 depicted in FIG. 5, this means that, because the sequence of the data 160 begins with "110110", its user can openly communicate on the first, second, fourth, and fifth logical channels by moving the channel buttons 130 (FIG. 3) to those channels. With this improved method of logical channel assignment, one of the full duplex transceiver assemblies 102, 212, 222, 232, 242, 252, 262, 272, 282, 292, 302, and 312 within the same group can receive and transmit data on any one of the logical channel numbers without being interrupted by co-channel users.

In the example of FIG. 4, this corresponds to a significantly improved method of communication. Specifically, if full duplex transceiver assemblies 102, 212, 222, 232, 242, and 252 have a "1" in the first bit space of the controlling data they are emitting, those six full duplex transceiver assemblies 102, 212, 222, 232, 242, and 252 can freely communicate in full duplex on logical channel one. At the same time as full duplex transceiver assemblies 102, 212, 222, 232, 242, and 252 are communicating on logical channel one, if full duplex transceiver assemblies 262 and 272 have a "1" in their second bit spaces of the controlling data they are emitting, they can simultaneously communicate in full duplex on logical channel two. Additionally, while all of this communication is going on with full duplex transceiver assemblies 102, 212, 222, 232, 242, and 252 on the first logical channel, and with full duplex transceiver assemblies 262 and 272 on the second logical channel, full duplex transceiver assemblies 282 and 292 can freely communicate in full duplex on the third logical channel, provided they each have a "1" in their third bit space of the controlling data they are emitting. Additionally, full duplex transceiver assemblies 302 and 312 can simultaneously freely communicate in full duplex on the fourth logical channel, provided they each have a "1" in their fourth bit space of the controlling data they are emitting.

This is depicted in FIG. 4, which shows one of the plurality of sequences the full duplex transceiver assemblies 102, 212, 222, 232, 242, 252, 262, 272, 282, 292, 302, and 312 are configured to have. In the sequence of FIG. 4, two or more of the full duplex transceiver assemblies (in the non-limiting example of FIG. 4 it is the full duplex transceiver assemblies 102, 212, 222, 232, 242, and 252) are on a first logical channel (e.g., have a binary bit "1" in the first space of the controlling data they are each emitting), thereby allowing the users of these full duplex transceiver assemblies 102, 212, 222, 232, 242, and 252 to communicate with each other on the first logical channel in full duplex. Simultaneously (e.g., while full duplex transceiver assemblies 102, 212, 222, 232, 242, and 252 are communicating on logical channel 1 with each other), another two or more of the plurality of full duplex transceiver assemblies (in the non-limiting example of FIG. 4 it is the full duplex transceiver assemblies 262 and 272) are on a second logical channel (e.g., have a binary bit "1" in the second space of the controlling data they are each emitting), thereby allowing the users of these full duplex transceiver assemblies 262 and 272 to communicate on the second logical channel in full duplex. Simultaneously (e.g., while full duplex transceiver assemblies 102, 212, 222, 232, 242, and 252 are communicating on logical channel 1 and full duplex transceiver assemblies 262 and 272 are communicating on logical channel 2), it is contemplated that a further two or more full duplex transceiver assemblies (in the non-limiting example of FIG. 4 it is the full duplex transceiver assemblies 282 and 292) are on a third logical channel (e.g., have a "1" in the third bit space of the controlling data they are each emitting), thereby allowing the users of these full duplex transceiver assemblies 282 and 292 to communicate on the third logical channel in full duplex. Additionally, in the first sequence, an additional two or more of the full duplex transceiver assemblies (in the example of FIG. 4 it is the full duplex transceiver assemblies 302 and 312) are on a fourth logical channel (e.g., have a "1" in the fourth bit space of the controlling data they are each emitting), thereby allowing the users of these full duplex transceiver assemblies 302 and 312 to communicate on the fourth logical channel in full duplex.

As a result of the novel communication system 202, any full duplex transceiver assembly can have a "1" in one or more than one of the bit spaces, thereby providing a communication connection among all of the users on any logical channel. In the NFL, it is important for the head coach to communicate something during the game to all coaches at the same time regardless of what channel they are on. By pressing and holding one of the volume adjustment buttons 132, a "1" is automatically inserted in all logical channels, thus allowing the head coach to make one broadcast that will allow all coaches regardless of the channel they are on to hear the head coach. In addition, pressing the push to talk button 134 allows another "1" to be inserted into the bit space, thereby providing communication to the helmet receiver channel and/or providing output power on two pins.

Moreover, because of the novel method of call distribution, pressing and holding one of the volume adjustment buttons 132 will allow a "1" to be inserted into all bits that provide communication to the helmet receiver, and/or produce voltages on all full duplex transceiver assemblies that are programmed to produce such voltage. As an example, in an airport environment, controlling voltage on full duplex transceiver assemblies is very useful. Pressing the push to talk button 134 will produce voltage on one full duplex transceiver assembly that may turn on one runway light, however pressing and holding one of the volume adjustment buttons 132 will provide output on all full duplex transceiver assemblies, thus turning on multiple runway lights. Another useful feature not employed in today's art is the need to broadcast over pubic safety full duplex transceiver assemblies at the same time. Most fire trucks have more than one radio which they use to communicate on to one or more than one dispatch centers. However, in today's art, the firefighter can only talk on one radio at a time. By interconnecting one of the disclosed full duplex transceiver assemblies 102, 202, 212, 222, 232, 242, 252, 262, 272, 282, 292, 302, and 312 with one or more public safety radios on multiple radio bands, firefighters will advantageously have the ability to communicate to the dispatch centers by pressing their respective push to talk button (e.g., button 134). Each logical channel can connect to a specific radio or radios operating on different bands simply by pressing the push to talk button 134. In addition, in the event of an emergency where mutual aid is needed, the firefighter can simply press and hold the one of the volume adjustment buttons 132, which will activate all radios and provide one single transmission to be broadcast over all public safety bands.

In the example of FIG. 4, the full duplex transceiver assemblies 102, 212, 222, 232, 242, and 252 on the first logical channel, the full duplex transceiver assemblies 262 and 272 on the second logical channel, the full duplex transceiver assemblies 282 and 292 on the third logical channel, and the full duplex transceiver assemblies 302 and 312 on the fourth logical channel are all on the same actual frequency, but provide such communication as if they are on separate physical channels. It will be appreciated that any alternative combination of communication amongst the full duplex transceiver assemblies 102, 212, 222, 232, 242, 252, 262, 272, 282, 292, 302, and 312 of the communication system 202 is possible, as a result of the logical channel assignment method of the disclosed concept. Furthermore, any one of the full duplex transceiver assemblies 102, 212, 222, 232, 242, 252, 262, 272, 282, 292, 302, and 312 can share other independent features. For example and without limitation, with multiple full duplex transceiver assemblies being on a single logical channel, the users are free to communicate in full duplex.

Furthermore, the communication system 202 is also advantageous to firefighters fighting to extinguish a fire. It is known that during a fire, firefighters have to hold on to fire hoses. These hoses, due to the immensely large volume of water passing through them, require considerable strength to hold. As such, usage of both hands by a firefighter on the hose is desirable. However, the systems by which today's firefighters communicate today generally require a firefighter holding the hose to remove one of their hands from the hose, press a button on their full duplex transceiver assembly, and communicate to the other firefighters that water flow is at a dangerous pressure and needs to be lowered immediately. This transition is a dangerous moment for a firefighter because the hose is being grasped by only one hand. In accordance with the disclosed concept, a firefighter wearing the full duplex transceiver assembly 102 can communicate in full duplex with other firefighters, who can turn off the water without the firefighter who is holding the hose ever having to let go.

In addition, with respect to safety, in today's systems where a fire fighter uses a standard walkie talkie, this would prevent the fire fighter from communicating with the 911 dispatch center to deploy more resources if the fire was extensive. With the controlled voltage feature that the disclosed concept implements, a fire fighter, in addition to communicating with other team members in full duplex (e.g., speaking openly with one another) within the group, can communicate to the 911 dispatch center. In order to perform this function, the fire fighter can push the push to talk button 134 to activate another device that is connected into a 911 transceiver, which is mounted in a fire truck, other vehicle, or portable that is connected to the 911 dispatch center. This allows the user of the device to have extreme safety by using full duplex communication for team members, as well as direct connect to the 911 dispatch center when pressing the push to talk button 134. Moreover, by pressing one of the volume adjustment buttons 132, a controlled voltage on one or more full duplex transceiver assemblies connected to one or more radios on different bands will be released. As such, if for example different fire departments in different counties were together fighting a fire, firefighters using one of the disclosed full duplex transceiver assemblies who press a volume adjustment button will produce a voltage (e.g., five volts) on other full duplex transceiver assemblies, such as the full duplex transceiver assemblies connected to each bands radio, thereby allowing that firefighter not only communicate on his primary band, but also to communicate on a second band. That is, that firefighter would not have to switch over between channels to talk to a different firefighter and a dispatch center. Stated differently, pressing one button will transmit to different dispatch centers, significantly saving the fire fighter time and also improving safety.

It will also be appreciated that the communication system 202 allows for communication with external receivers, such as external receivers 407, 408, 409, and 410, shown as part of the communication system 202 in FIG. 4. Referring again to FIG. 5, in one example embodiment, bit spaces 7-11 represent channels on which the full duplex transceiver assembly 102 is capable of communicating with the external receivers 407, 408, 409, 410. As the data 160 in this sequence is "100000", the full duplex transceiver assembly 102 is capable of communicating with receivers listening to the seventh logical channel, e.g., the receiver 407 shown in FIG. 4. As such, responsive to the full duplex transceiver assembly 102 pushing the push to talk button 134 (FIG. 3), the full duplex transceiver assembly 102 can communicate with at least one of the external receivers 407, 408, 409, and 410 while still communicating among the plurality of different logical channels, as long as the push to talk button of the full duplex transceiver assembly 102 is being pushed. This allows the receiver 407 to listen to the communication from the full duplex transceiver assembly 102 since it is sending data on one of the logical channels 7-12 associated with the receiver 407, and the logical channels 1-6. It will also be appreciated that any of the other receivers 408, 409, and 410 could also or alternately be programmed to listen to the seventh channel, wherein the full duplex transceiver assembly 102 might communicate with any number of receivers. Additionally, if the user of the full duplex transceiver assembly 212 in the sequence of FIG. 4 were to push its push to talk button, that user could be allowed to communicate with at least one other of the external receivers 408, 409, and 410 while still communicating among the plurality of different logical channels, as long as the push to talk button of the second full duplex transceiver assembly is being pushed. Furthermore, it is contemplated that if the user of the transceiver 212 in the sequence of FIG. 4 were to push its push to talk button, that user could communicate with at least one of the external receivers 407, 408, 409, and 410 while still communicating among the plurality of different logical channels, as long as the push to talk button of the full duplex transceiver assembly 212 is being pushed.

It also follows that if the data were to have a "0" in the seventh data space and a "1" in the eighth data space, the full duplex transceiver assembly 102 would be programmed to communicate with receivers listening to the eighth logical channel instead of the seventh. Additionally, in one example embodiment, the push to talk button 134 feature is provided as the fourteenth bit space of the data 160. Accordingly, if the data 160 provides for a "1" in one of the bit spaces 7-12, it necessarily follows that the data 160 will have a "0" in the fourteenth bit space, as shown in FIG. 5. Moreover, it is also contemplated that if a user of the full duplex transceiver assembly 102 presses and holds one of the volume adjustment buttons 132 (e.g., the down button), a "1" is inserted into its bit spaces 7 to 12, thereby allowing that user to communicate to all receivers at the same time.

In an NFL context, for example and without limitation, this may present as an offensive coordinator wearing the full duplex transceiver assembly 102 pressing the push to talk button 134 in order to allow a quarterback wearing the receiver 407 (e.g., via his or her helmet) to be tuned into, for example, the conversations of the coaches on the offensive logical channel. While typical push to talk features in prior art systems are provided on separate devices, such as the walkie talkie 20 shown in FIGS. 1 and 2, the instant disclosed concept advantageously integrates this feature with the full duplex transceiver assembly 102. As such, it will be appreciated that the communication system 202, in one example embodiment, is devoid of a walkie talkie separate and apart from the plurality of full duplex transceiver assemblies 102, 212, 222, 232, 242, 252, 262, 272, 282, 292, 302, 312. In the NFL context, this presents as a significantly improved unit for a user to wear by consolidating the total equipment to one self-contained full duplex transceiver assembly.

Continuing to refer to FIG. 5, the instant disclosed concept advantageously provides for a group call feature. Specifically, if the data being emitted by one of the full duplex transceiver assemblies has a "1" in, for example, the thirteenth data space, regardless of the logical channel it resides on, that full duplex transceiver assembly has the ability to communicate with every other full duplex transceiver assembly. This may be done by, in one example embodiment, pressing and holding one of the volume buttons 132 (e.g., the volume up button for a predetermined time). In practice, this would present as the full duplex transceiver assembly 102, which does have a "1" in the thirteenth data space of the data 160, pressing and holding the volume up button 132, and in accordingly, being heard by every one of the other full duplex transceiver assemblies 212, 222, 232, 242, 252, 262, 272, 282, 292, 302, and 312. This is advantageous in many contexts. For example, in the NFL, if a head coach wants to communicate with every coach to pass along an important message, the coach can immediately be linked to, and speak to, all of the other coaches, even if they are on different logical channels.

Figure 6:
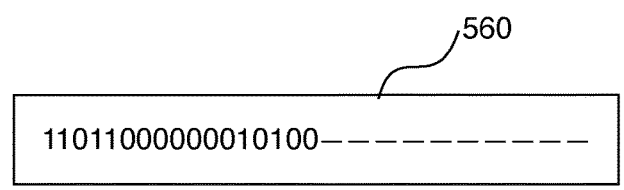
FIG. 6 is an array of data emitted by a full duplex transceiver assembly, in accordance with one non-limiting embodiment of the disclosed concept.

Another advantageous feature of the communication system 202 pertains to the ability of the full duplex transceiver assemblies 102, 212, 222, 232, 242, 252, 262, 272, 282, 292, 302, and 312 to send voltage signals, and to generate a controlled voltage. Specifically, if for example and without limitation, the fifteenth data space of the emitted data is a "1", then that transceiver full duplex transceiver assembly is programmed to activate a cable controlled voltage feature of another full duplex transceiver assembly. For example, FIG. 6 shows an array of data 560 that may be emitted by another full duplex transceiver assembly. As shown, data spaces 7-12 correspond to "000000" and the fifteenth data space is a "1". Accordingly, because data spaces 7-12 are zero, if the user of the full duplex transceiver assembly presses the push to talk button, no communication will be had on one of the seventh to twelfth logical channels. However, in accordance with the disclosed concept, because the data 560 has a "1" in the fifteenth data space, when the user of the full duplex transceiver assembly 212 presses the push to talk button, a signal will be sent to all other full duplex transceiver assemblies (e.g., one or more full duplex transceiver assemblies) within the group that are on the same logical channel, and that also have a "1" in the fifteenth data space, to release a controlled voltage (e.g., without limitation, 5 volts as long as the push to talk button is being pressed). This feature is particularly advantageous in the airline industry, wherein workers on the ground are tasked with guiding planes on and off of runways. These workers rely on lit up runways, and in accordance with the disclosed concept, rather than having to communicate back and forth with control towers to light up runways, these workers can activate their cable controlled voltage features on their full duplex transceiver assemblies, which would prompt a signal to be sent to another full duplex transceiver assembly, which would generate a controlled voltage to automatically turn on the lights for a runway, thereby significantly improving the ability of airplanes to land and take off.

Figure 7:
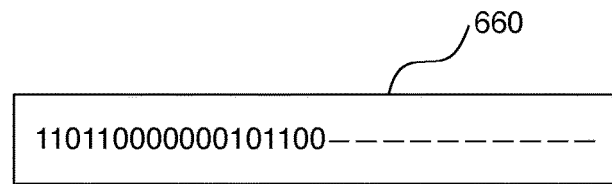
FIG. 7 is another array of data emitted by a full duplex transceiver assembly, in accordance with another non-limiting embodiment of the disclosed concept.

Another advantageous feature of the disclosed concept is that each of the full duplex transceiver assemblies 102, 212, 222, 232, 242, 252, 262, 272, 282, 292, 302, and 312 may include a latch. For example, FIG. 7 shows an array of data 660 that may be emitted by another full duplex transceiver assembly. As shown, data spaces 7-12 correspond to "000000" and the fifteenth and sixteenth data spaces correspond to "11". Accordingly, because data spaces 7-12 are zero, if the user of the full duplex transceiver assembly presses the push to talk button, no communication will be had on one of the seventh to twelfth logical channels. However, if the user presses the push to talk button, a single controlled voltage (e.g., 5 volts of electricity) will be released from the controlled voltage features of the other full duplex transceiver assemblies (one or more of the full duplex transceiver assemblies) within the group that are on the same logical channel, and that also have "11" in the fifteenth and sixteenth data spaces of the data emitted from their full duplex transceiver assemblies. If the user presses the push to talk button a second later time, the 5 volts of electricity will be released. Accordingly, this feature allows for a particularly controlled amount of voltage to be released by the other full duplex transceiver assemblies within the group.

One application of this feature pertains to nuclear power plants. Specifically, in this context, the advantage of the controlled voltage feature is where a user wearing the device can produce a relay closure linking that device to the public switch telephone network allowing for land line or cell phone communication to pass directly to the device. For example, an engineer could be located 1000 miles from the nuclear power plant. That engineer could, upon determining that there is a problem with the nuclear power plant system, place a call to a switch telephone network using a cell phone or land line. Subsequently, a full duplex transceiver assembly in accordance with the disclosed concept could be connected to the switch telephone network. Additionally, a technician and/or others who are wearing full duplex transceiver assemblies paired with the full duplex transceiver assembly connected to the switch telephone network can push a push to talk button, which would let out a voltage in the t full duplex transceiver assembly connected to the network, thereby connecting the engineer to the full duplex transceiver assemblies which might be located at the nuclear power plant. Quick and reliable communication is thus provided, thereby significantly improving the ability of the engineer and technician to solve the problem.

Another advantage of the disclosed concept of logical channel assignment pertains to "call types". "Call types" allow a group of devices within the same group, and while communicating in the same group, to shell out to other independent logical channel and perform two layers of communications, one within the paired group of devices and the other to an independent device associated with one device within the individual group on other logical channels. This is not possible within any device in today's art. It will be appreciated that the communication system 202 can use 256 logical channels in a single group, thereby allowing a device to receive and transmit data from that device on a different logical channel. This means that the channel is only a number in the logical data stream of 256 logical channels. All of this logical data may then be added to the voice data stream whenever the device sends its voice data. By achieving this in a logical channel format, all devices in the same group automatically knows the assigned logical channel and the data being sent.

Today, the NFL controls how long the coach or coaches can talk to the player with the helmet receiver. The method used today by the NFL is UHF walkie talkies, UHF repeaters and UHF mini receivers. The NFL limits the time the coach can speak to the player. That time begins when the 40 second play clock begins counting down. At 15 seconds, the referee cuts the communication through the repeater to the player. With the disclosed technology, the full duplex transceiver assembly 102 can be connected to the automated play clock controller through the six-pin connection. When the automated play clock controller begins counting down from 40 second, a dry contact closure is produced. Connecting two pins from the disclosed full duplex transceiver assembly 102 to the contact relay will initiate the communication path from the coach to the player, thus allowing the coach using one of the disclosed full duplex transceiver assemblies 102, 212, 222, 232, 242, 252, 262, 272, 282, 292, 302, and 312 to communicate with at least one of the external receivers 407, 408, 409, and 410 without the need for a walkie talkie, repeater, or external antenna. Once the automated play clock controller reaches 15 seconds, the relay contact turns to an OPEN state thus cutting the communication from the coach to the player. This is a significant improvement over todays method.

Additionally, one of the full duplex transceiver assemblies 102, 212, 222, 232, 242, 252, 262, 272, 282, 292, 302, and 312 may be electrically connected to a timer (e.g., a play clock in the NFL context that limits the time an offense has to snap the ball before a penalty flag is thrown) that is configured to countdown from a first time to zero. In accordance with the disclosed concept, responsive to pushing the push to talk button of one of the other full duplex transceiver assemblies (e.g., the full duplex transceiver assembly 212) allows that full duplex transceiver assembly 212 to communicate with the external receivers (e.g., without limitation, earpieces of the offensive players in the NFL context) 407, 408, 409, and 410 as long as the push to talk button of that full duplex transceiver assembly 212 is being pushed and as long as the timer is counting down from the first time to a second time between the first time and zero. Furthermore, when the timer counts down from the second time to zero, the full duplex transceiver assembly 102 prevents the full duplex transceiver assembly 212 from communicating with the external receivers 407, 408, 409, and 410 when the push to talk button of the full duplex transceiver assembly 212 is being pushed.

Accordingly, the disclosed concept contemplates that a method of providing a communication system includes the steps of providing the full duplex transceiver assemblies 102, 212, 222, 232, 242, 252, 262, 272, 282, 292, 302, and 312, emitting a different stream of controlling data with the microprocessor of each of the plurality of full duplex transceiver assemblies 102, 212, 222, 232, 242, 252, 262, 272, 282, 292, 302, and 312 when the plurality of full duplex transceiver assemblies are in the ON condition, thereby allowing each of the full duplex transceiver assemblies 102, 212, 222, 232, 242, 252, 262, 272, 282, 292, 302, and 312 to communicate among a plurality of different logical channels, and embedding with each different stream of controlling data a unique identification number for grouping the full duplex transceiver assemblies 102, 212, 222, 232, 242, 252, 262, 272, 282, 292, 302, and 312 together. It will also be appreciated that providing the full duplex transceiver assemblies 102, 212, 222, 232, 242, 252, 262, 272, 282, 292, 302, and 312 may consist of providing the full duplex transceiver assemblies 102, 212, 222, 232, 242, 252, 262, 272, 282, 292, 302, and 312 without requiring a sweep for interfering external devices. In the NFL context, this corresponds to an extremely simplified method of setup, wherein sweeps of football stadiums, which currently take extensive time prior to kickoff, can be eliminated.

By using logical channel assignments, the communication system 202 is more reliable and stable in terms of transferring and receiving controlled information within a paired group. To achieve this, the communication system 202 adopts the abovementioned frequency hopping method with logical channels and data diversity at the same exact time. One group of devices may use 40 physical frequency channels to hop every 4.6 ms according to a secured sequence randomly generated for each group. As such, the above mentioned method may further include occupying with the full duplex transceiver assembly 102 a first physical frequency for less than 5 milliseconds (e.g., 4.6 milliseconds), hopping the full duplex transceiver assembly 102 to a second physical frequency different than the first physical frequency, occupying with the full duplex transceiver assembly 102 the second physical frequency for less than 5 milliseconds (e.g., 4.6 milliseconds), and hopping the full duplex transceiver assembly 102 to a third physical frequency different than the second physical frequency.

For example, if there is another system other than the communication system 202 using a fixed physical channel 1, and that other system is sending a data stream continually through channel 1, and an existing transceiver hops onto channel 1 to send data, other devices grouped with the existing transceiver could not receive the data due to the interference being caused by the other communication system. In accordance with the disclosed concept, the full duplex transceiver assembly 102 that hops onto channel 1 will occupy channel 1 frequency for only 4.6 ms and will then hop to another frequency. Even though there was interference from the other communication system, the full duplex transceiver assembly 102 only loses one packet of data. However, in addition to this data, multiple data packets are sent using two different channel frequencies. This may be referred to as "data diversity". This means, even though the transceiver loses the first data packet by interference from the other communication system, there is other additional data available through another channel in the logical group via data diversity. This frequency hopping and diversity allows the communication system 202 to have clearer communication because the diversity method provides redundancy. Thus, a much longer frequency range is achieved than known systems, regardless of any congestion.

Additionally, as discussed above, known systems rely on single data distribution (SDD). The instant disclosed concept provides a solution to this problem of having the failure of the SDD be catastrophic to the system's ability to be integrated. More specifically, whichever one of the full duplex transceiver assemblies 102, 212, 222, 232, 242, 252, 262, 272, 282, 292, 302, and 312 is designated as being the SDD (e.g., the device that instructs each of the remaining devices when and what channel to switch to, as well as all of the underlying features that have been assigned to that full duplex transceiver assembly), that full duplex transceiver assembly is programmed to give a "WILL" command to the other full duplex transceiver assemblies 102, 212, 222, 232, 242, 252, 262, 272, 282, 292, 302, and 312 prior to it failing. The "WILL" command outlines the instructions of what needs to be carried out if it were to be in a FAILED state, e.g., likened to a will from a decedent to living relatives. Accordingly, if SDD fails, instructions that are given to the other full duplex transceiver assemblies 102, 212, 222, 232, 242, 252, 262, 272, 282, 292, 302, and 312 program them to know how to operate, e.g., frequency sequences, etc. As such, it will be appreciated that the method further includes embedding within the different stream of controlling data of a first one of the full duplex transceiver assemblies a WILL command in order to allow a second one of the full duplex transceiver assemblies to function as a controller transceiver in case the first full duplex transceiver assembly is in the FAILED state, and responsive to the first full duplex transceiver assembly being in the FAILED state, assigning the WILL command to one or more of the full duplex transceiver assemblies. It is further contemplated that the WILL command is configured to remain with a given full duplex transceiver assembly. As such, it will be appreciated that responsive to the first full duplex transceiver assembly moving from the ON condition to the OFF condition and back to the ON condition, the WILL command stays assigned to the first full duplex transceiver assembly.

It is also within the scope of the disclosed concept for any number of full duplex transceiver assemblies within the communication system 202 that are not assigned a user ID number to join the group by pressing a push to talk button. When these full duplex transceiver assemblies join the group, they will be able to transmit to all conversations on the specific logical channel which they are occupying. Provided there is a user ID for a transceiver to occupy, when the user of that transceiver presses its push to talk button, it will automatically be assigned as a temporary user ID (e.g., temporary user ID 12), thereby allowing the user of this additional full duplex transceiver assembly to communicate with other full duplex transceiver assemblies sharing the same logical channel as long as the push to talk button of this additional full duplex transceiver assembly is being pushed. However, when the push to talk button is released, the temporary user ID is surrendered, thus allowing it to be used by other devices not assigned a user ID.

The temporary user IDs can be understood as floating user IDs. For example, when a given full duplex transceiver assembly surrenders its user ID, a "1" in a data space (e.g., the fourth data space) will change to a "0" in that data space. At that time, if one of the other full duplex transceiver assemblies that does not currently have a user ID presses its push to talk button, and no other full duplex transceiver assembly has yet occupied the now surrendered user ID, that full duplex transceiver assembly will then have a "0" in its fourth data space be changed to a "1," thereby allowing that full duplex transceiver assembly to communicate with anyone on the fourth logical channel in full duplex, as long as the push to talk button is being pressed.

It is also understood that in the football context, certain coaches (e.g., head coach, offensive coordinator, defensive coordinator) may never surrender their user IDs, e.g., they are dedicated. Stated differently, with these coaches, it is understood that full duplex transceiver assemblies with floating user IDs can never occupy the dedicated user IDs. However, for example and without limitation, other coaches (e.g., an offensive line coach) may surrender their user IDs as described above, thereby allowing any number of full duplex transceiver assemblies with floating user IDs to temporarily occupy any unoccupied user ID.

Figure 8:
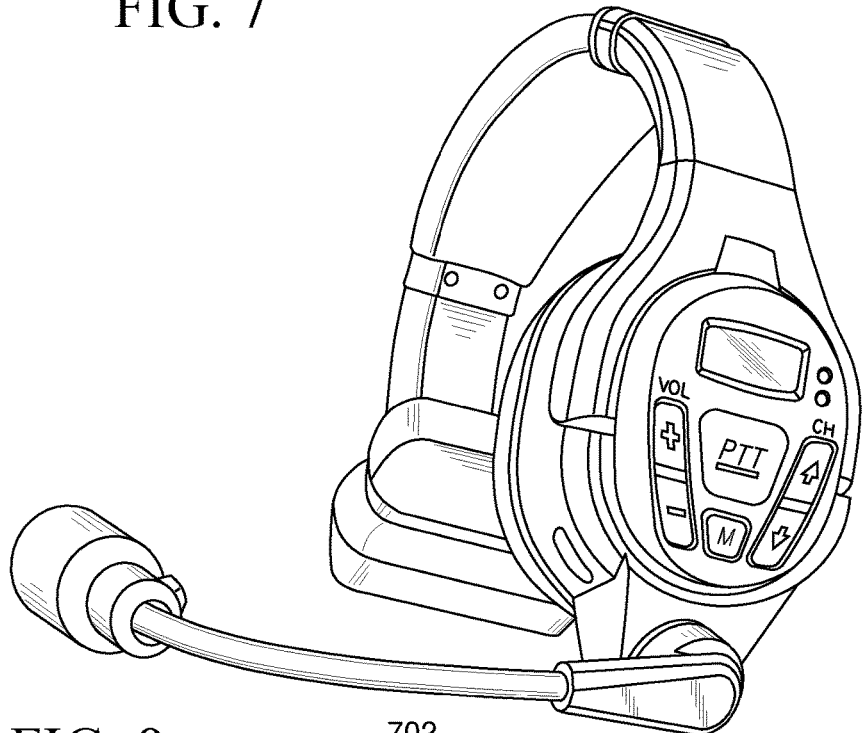
FIG. 8 is an isometric view of a headset assembly, in accordance with one non-limiting embodiment of the disclosed concept.
Figure 9:
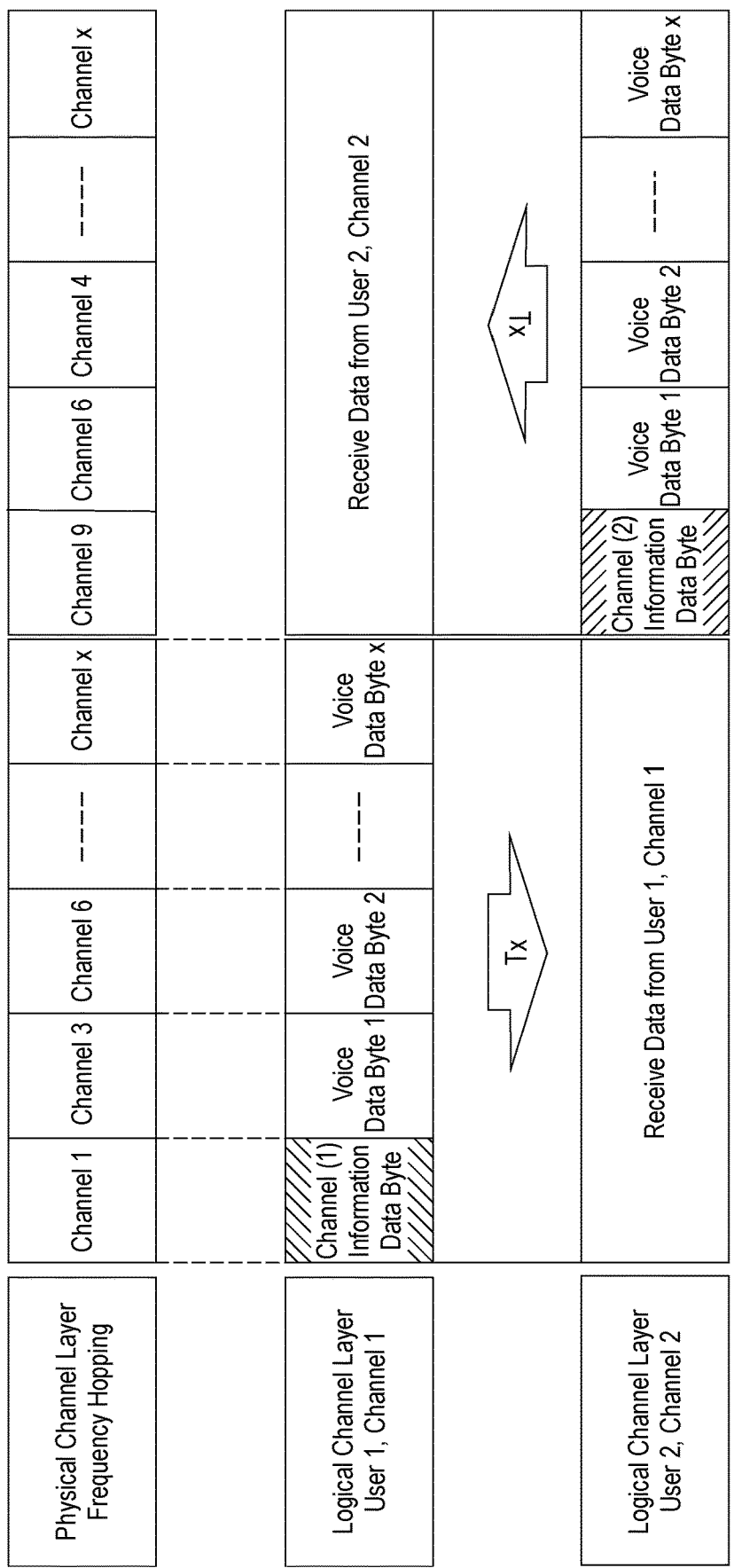
FIG. 9 is a chart of features and sub channel assignments, in accordance with embodiments of the disclosed concept.
Figure 10:
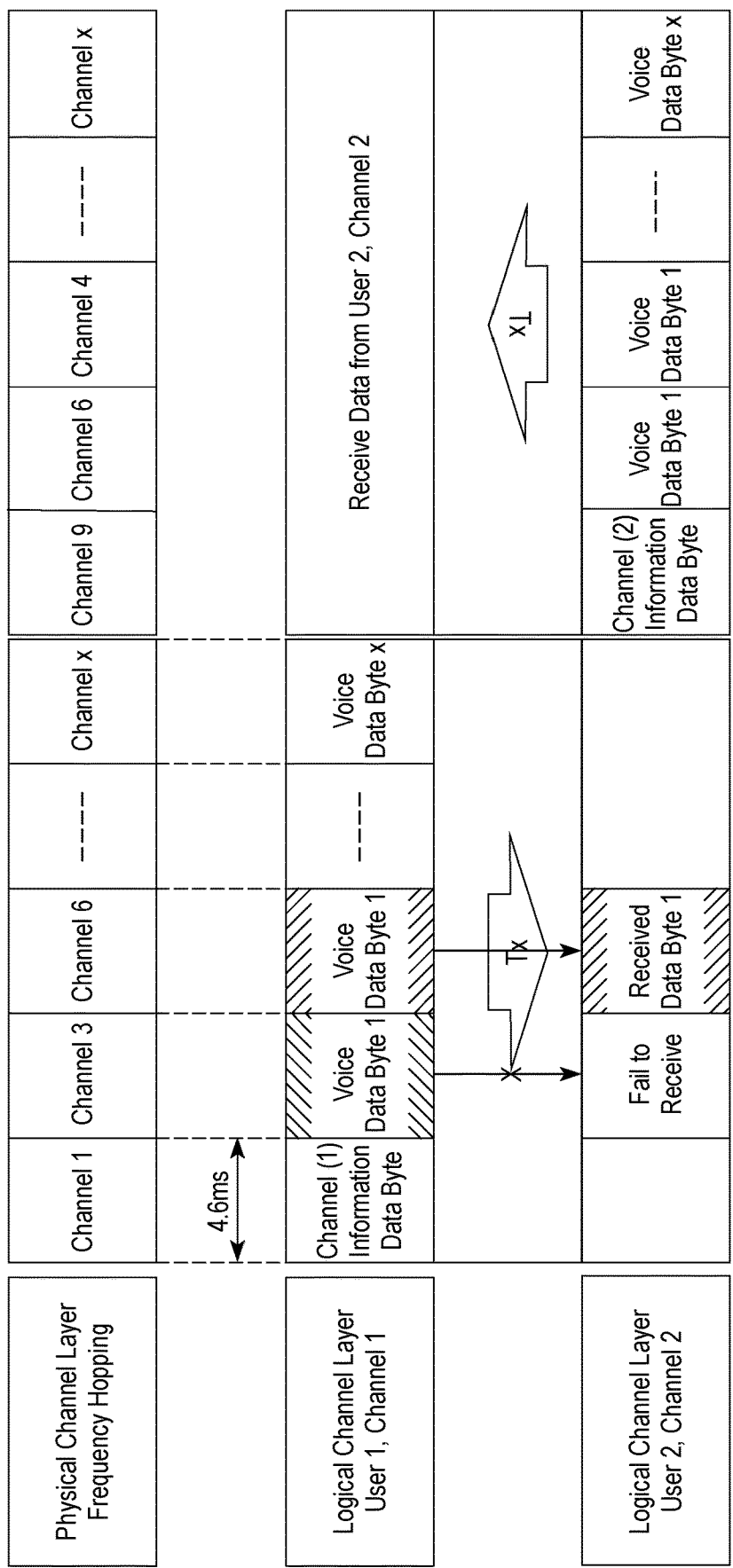
FIG. 10 is a chart of reliability provided by data diversity, in accordance with embodiments of the disclosed concept.

Moreover, the disclosed floating user ID assignment is not limited to being permitted by the pressing of a push to talk button. In accordance with the disclosed concept, the headsets 104, 214, 224, 234, 244, 254, 264, 274, 284, 294, 304, and 314 are each configured to have microphone booms electrically connected to respective full duplex transceiver assemblies, and that rotate between UP and DOWN positions, corresponding to a position where a user will not (UP) be heard and a position where a user will be heard (DOWN). See, for example, headset assembly 702 in FIG. 8, showing a microphone boom (shown but not labeled) in a DOWN position. Similar to the aspects described above with respect to pressing the push to talk buttons to temporarily occupy surrendered user IDs, the communication system 202 is configured to have non-dedicated full duplex transceiver assemblies (e.g., full duplex transceiver assemblies that are not assigned user IDs) be permitted to join a group by moving their respective microphone booms from the UP position to the down position, and exit a group by moving their respective microphone booms from the DOWN position to the UP position. When this transfer occurs, the results are the same as the above described wherein a pressing a push to talk button automatically automatically occupies an unused user ID from the surrendered transceiver. Stated differently, when the user lowers his or her microphone boom to the down position, his or her full duplex transceiver assembly will receive an electrical signal from the microphone boom and automatically have a bit space in its emitting data change from a "0" to a "1" in an unoccupied user ID, thereby allowing him or her to communicate on that logical channel as long as his or her microphone boom is down. It is also contemplated that users may surrender the current user IDs and occupy an unoccupied user ID by raising and lowering their respective microphone booms. That is, if a non-dedicated (e.g., a coach other than a head coach, offensive coordinator, defensive coordinator, or other coach that the team determines shall not surrender its user ID) coach raises his or her microphone boom, he or she will automatically surrender his or her user ID, thereby allowing a floating full duplex transceiver assembly to occupy the now surrendered user ID by lowering his or her microphone boom (e.g., and also by pressing his or her push to talk button). This aspect of the disclosed concept advantageously allows for many more full duplex transceiver assemblies to join the group beyond a predetermined limit (e.g., 12). Furthermore, by eliminating the need to use the push to talk button, users can communicate with two hands free, advantageously allowing them to take notes. That is, it will be appreciated that while the full duplex transceiver assemblies 102, 212, 222, 232, 242, 252, 262, 272, 282, 292, 302, and 312 comprise the disclosed communication system 202, any number of additional full duplex transceiver assemblies may be included in the system, and occupy given user IDs as just described when non-dedicated users (e.g., an offensive line coach as described above) surrender their user IDs.

Because logical channels are being employed as the channels through which information is being passed, one or more of the full duplex transceiver assemblies 102, 212, 222, 232, 242, 252, 262, 272, 282, 292, 302, and 312 can communicate on one logical channel in full duplex (e.g., free to speak openly with each other). Additionally, at the exact same time, one or more of the devices can have a separate communication path to another device on a separate logical channel performing the above mentioned functions. This is not possible in existing methods of full duplex communication. For example, known systems for communicating require the use of push to transmit and release to listen buttons if more than two transceivers are being used. This is commonly used in first responder walkie talkies as well as mobile radios that emit a digital stream. However, the digital stream is only emitted when the push to talk buttons are being pressed. This is inconvenient because it limits the amount of devices that can communicate in full duplex, e.g., typically only two devices. In accordance with the disclosed concept, a controlling stream of data is being continually emitted in order to allow full duplex communication among the paired devices. This advantageously allows significantly more devices to communicate in full duplex and also allows communication without always requiring a push to talk button to be pressed.

Moreover, in time delay multiple access (TDMA), there are limits to the amount of devices that can communicate in full duplex. For example, a typical TDMA device used in first responder radios allows multiple paths of communication to two separate transceivers. With more than two transceivers, in typical TDMA, these devices have to be push to talk because the transceivers occupy a specific channel in the TDMA method. Stated differently, with typical TDMA devices, only two devices can readily communicate in full duplex. The addition of a third device would undesirably require the other two devices to operate in push to talk simplex mode. This is again different from the disclosed concept, wherein logical channels advantageously allows for multiple (e.g., in the disclosed communication system 202 the number is at least 12 full duplex transceiver assemblies, however any number greater than two is contemplated), full duplex transceiver assemblies to communicate in full duplex at the same time.

In an alternative embodiment of the disclosed concept, FIG. 8 shows a headset assembly 702 incorporating a full duplex transceiver assembly in an earpiece of a headset. It will be appreciated that the headset assembly 702 is configured to function exactly the same as the full duplex transceiver assembly 102 and headset 104, discussed above. However, by being integrated into one self-contained subassembly, the headset assembly 702 advantageously provides for a more comfortable experience for users. Accordingly, a plurality of full duplex transceiver assemblies of an alternative communication system may include a plurality of headsets that are each integrated with a corresponding full duplex transceiver assembly (e.g., one of the full duplex transceiver assemblies 102, 212, 222, 232, 242, 252, 262, 272, 282, 292, 302, and 312) so as to form a plurality of self-contained subassemblies each devoid of an external cord between a corresponding full duplex transceiver assembly and a corresponding headset. Additionally, an alternative communication system may have headsets/transceivers integrated as just described, as well as headsets/transceivers electrically connected by external cords.

Figure 11:
FIG. 11 shows a conventional sideline huddle wherein multiple players are gathered around a coach to discuss game strategy.
Figure 12:
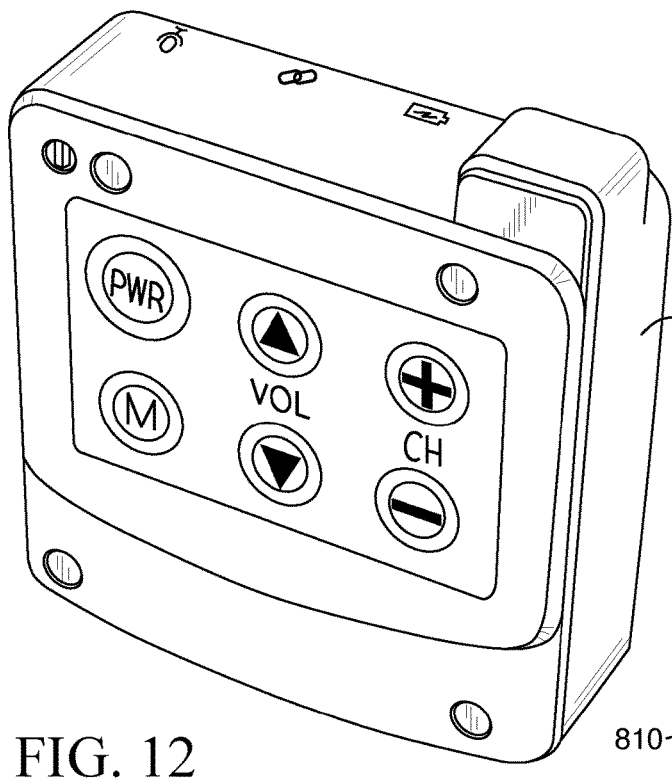
FIGS. 12 and 13 show different views of a full duplex transceiver amplifier assembly assembly, in accordance with one non-limiting embodiment of the disclosed concept.
Figure 14:
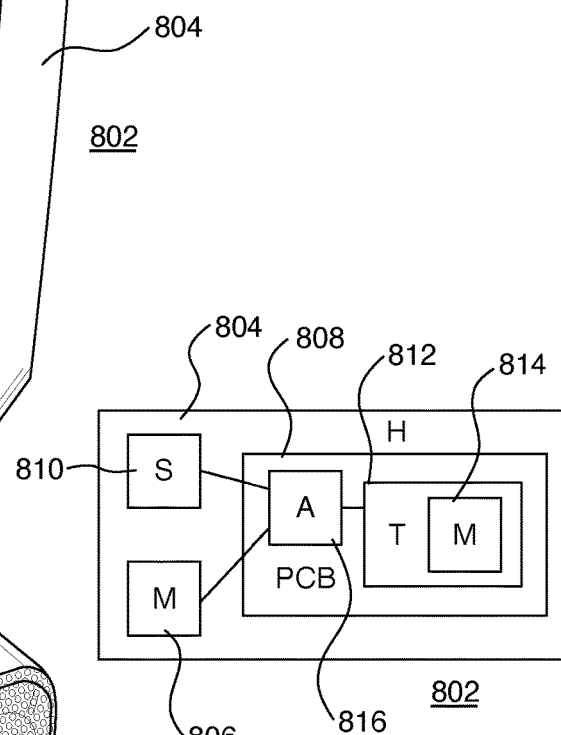
FIG. 14 is a simplified view of the full duplex transceiver amplifier assembly of FIGS. 12 and 13.
Figure 13:
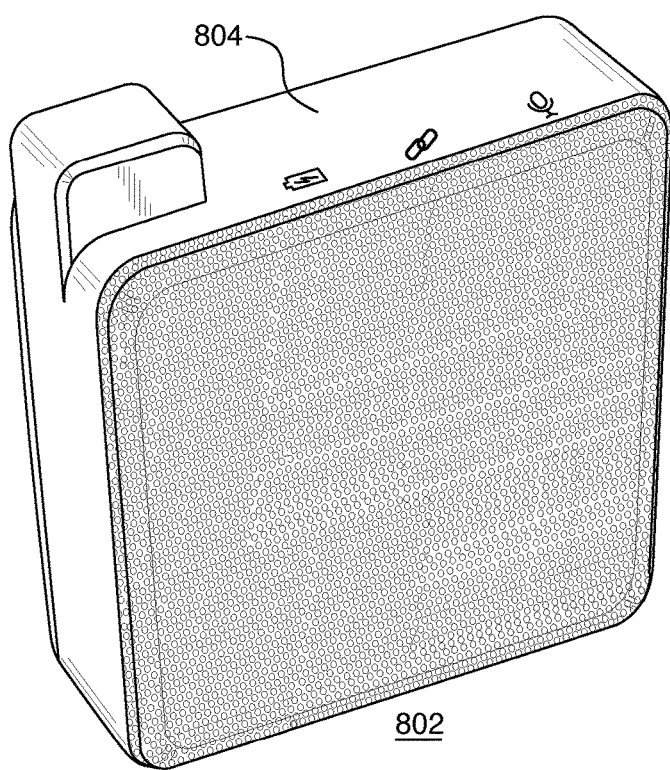

FIG. 11 shows a conventional sideline huddle wherein multiple players are gathered around a coach to discuss game strategy. In this conventional method, the coach proximate the players may listen to another coach (e.g., an offensive coordinator) in a press box, and relay what that coach is saying to the surrounding players. This is an inefficient method because all of the players on the ground cannot hear the coach in the press box, and also cannot talk to the coach in the press box. In a further alternative embodiment of the disclosed concept, FIGS. 12 and 13 show a full duplex transceiver amplifier assembly 802 configured to remedy these deficiencies of conventional methods. The assembly 802 includes a housing 804, a bi-directional microphone 806 (shown in simplified form in FIG. 14) coupled to the housing 804, a printed circuit board 808 (shown in simplified form in FIG. 14) coupled to and located within the housing 804, and a speaker 810 (shown in simplified form in FIG. 14) electrically connected to the printed circuit board. The printed circuit board 808 includes a transceiver 812 having a microprocessor 814, and a bi-directional amplifier 816 electrically connected to the microphone, the speaker and the transceiver. The transceiver of the assembly 802 is preferably configured exactly the same as the transceivers of the full duplex transceiver assemblies 102, 202, 212, 222, 232, 242, 252, 262, 272, 282, 292, 302, and 312, discussed above.

Additionally, the microprocessor of the transceiver 812 of the communication assembly 802 is configured to emit a delayed controlling stream of data, thereby allowing audio to pass between the transceiver 812 and the amplifier 816 without feedback, regardless of the amplification level and the proximity of the microphone to the speaker. It is understood in the art that when a microphone and an amplifier are in close proximity to one another, and audio from the microphone is received at the amplifier, some of the resulting audio from the amplifier passes back into the microphone, a situation known as feedback. However, in accordance with the disclosed concept, the microprocessor 814 advantageously emits a delayed controlling stream of data (e.g., delayed at least 4 milliseconds), thereby eliminating any possibility for undesirable feedback. Accordingly, when players on the field are in close proximity to the assembly 802, they will easily hear communications on whatever logical channel the assembly's 802 transceiver is on via the microphone of the assembly 802, and will also be able to communicate with a coach (e.g., an offensive coordinator in a press box) listening to the same logical channel as the transceiver 812 of the communication assembly 802 by speaking into the microphone of the assembly 802. It will be appreciated that these advantages are achieved via one self-contained subassembly 802, rather than a conglomeration of separate components wired together. It will also be appreciated that the assembly 802 has all of the same functions and capabilities as the full duplex transceiver assemblies 102, 202, 212, 222, 232, 242, 252, 262, 272, 282, 292, 302, and 312.

In one example embodiment, the full duplex transceiver amplifier assembly 802 further comprises an automatic gain controller coupled to the housing 804. When the full duplex transceiver amplifier assembly 802 is communicating with at least one of the full duplex transceiver assemblies 102, 202, 212, 222, 232, 242, 252, 262, 272, 282, 292, 302, and 312, e.g., the assembly 102, and, responsive to an audio level proximate the full duplex transceiver assembly 102 rising above a predetermined value, the automatic gain controller moves the full duplex transceiver amplifier assembly 802 from a TRANSMIT state to a RECEIVE state, thereby preventing audio from passing from the full duplex transceiver amplifier assembly 802 to the full duplex transceiver assembly 102. This presents a number of advantages. For example, in the NFL context, when a coach in a press box is using the full duplex assembly 102 and is communicating with players on the football field who are using the full duplex transceiver amplifier assembly 802, and wants to stop audio from entering his or her full duplex transceiver assembly 102, he or she can raise his or her voice above a predetermined value. One example advantage of this is that that coach will have a lower likelihood of losing a train of thought (e.g., being distracted by audio from the full duplex transceiver amplifier assembly 802, which is now cut off.

This feature of the full duplex transceiver amplifier assembly 802 is known as supervisory control. Supervisory control provides a mechanism for the audio flow to and from the full duplex transceiver amplifier assembly 802 to be controlled. More specifically, when a user of a corresponding one of the full duplex transceiver assemblies 102, 202, 212, 222, 232, 242, 252, 262, 272, 282, 292, 302, and 312 speaks at an audio level above a predetermined value, audio will be passed from that assembly to the full duplex transceiver amplifier assembly 802, but not the other way around. Furthermore, when an audio level from a user of one of the assemblies 102, 202, 212, 222, 232, 242, 252, 262, 272, 282, 292, 302, and 312 is below a predetermined value (e.g., without limitation, the user of the assembly 102 becomes silent), audio in the communication system is switched such that audio near the full duplex transceiver amplifier assembly 802 is configured to pass to the corresponding full duplex transceiver assembly 102, e.g., the automatic gain controller of the full duplex transceiver amplifier assembly 802 moves the full duplex transceiver amplifier assembly 802 from a RECEIVE state to a TRANSMIT state, thereby allowing audio to pass from the full duplex transceiver amplifier assembly 802 to the full duplex transceiver assembly 102.

In accordance with the disclosed concept, supervisory control within the communication system can prevent audio from flowing from the full duplex transceiver amplifier assembly 802 to at least a corresponding one of the full duplex transceiver assemblies 102, 202, 212, 222, 232, 242, 252, 262, 272, 282, 292, 302, and 312 responsive to a user of a corresponding full duplex transceiver assembly speaking at an audio level above a predetermined value. In operation, this may present, in one example embodiment, as players on a football field speaking into the full duplex transceiver amplifier assembly 802, and, a user of one of the full duplex transceiver assemblies 102, 202, 212, 222, 232, 242, 252, 262, 272, 282, 292, 302, and 312 interrupting the players by speaking into their assembly, switching the flow of audio in the communication system such that it goes from the corresponding full duplex transceiver assembly 102 into the full duplex transceiver amplifier assembly 802, rather than the flow going from the full duplex transceiver amplifier assembly 802 into the corresponding full duplex transceiver assembly 102.

It will also be appreciated that the firmware within the full duplex transceiver assemblies disclosed herein may be updated. For example, because the array of data (e.g., the 256 bit data) is a data stream, the assigned bits at any one time can be changed by updating the firmware. As disclosed herein, bit spaces 1-6 corresponded to talking channels while bit spaces 7-12 corresponded to communication pathways to external receivers. If the number of voice channels were desired to be expanded to eight instead of six, and eight for communication with external receivers instead of six, then bit spaces 0-8 would correspond to full duplex talk logical channels, and bit spaces 9-16 would correspond to communication pathways to external receivers. Additionally, if additional features in addition to group call, push to talk, controlled voltage, etc., were desired, the firmware could also be updated to provide for these additional features.

While this disclosure has been described as having exemplary methods, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

I claim:

1. A full duplex transceiver amplifier assembly comprising:
   a housing;
   a microphone coupled to the housing;
   a printed circuit board coupled to and disposed within the housing, the printed circuit board comprising a transceiver having a microprocessor, and an amplifier; and
   a speaker electrically connected to the printed circuit board, the amplifier being electrically connected to the microphone, the speaker and the transceiver,
   wherein the microprocessor is configured to emit a delayed controlling stream of data, wherein the microprocessor is configured to emit the delayed controlling stream of data in order to allow audio to pass between the transceiver and the amplifier without feedback, regardless of the amplification level and the proximity of the microphone to the speaker, and wherein the controlling stream of data is configured to be delayed at least 4 milliseconds by the microprocessor.

2. The full duplex transceiver amplifier assembly according to claim 1, being one self-contained subassembly.

3. The full duplex transceiver amplifier assembly according to claim 1, wherein the full duplex transceiver amplifier assembly is configured to communicate with a plurality of full duplex transceiver assemblies, the plurality of full duplex transceiver assemblies each comprising a transceiver having a microprocessor configured to emit a stream of controlling data.

4. A full duplex transceiver amplifier assembly comprising:
a housing;
a microphone coupled to the housing;
a printed circuit board coupled to and disposed within the housing, the printed circuit board comprising a transceiver having a microprocessor, and an amplifier; and
a speaker electrically connected to the printed circuit board, the amplifier being electrically connected to the microphone, the speaker and the transceiver,
wherein the microprocessor is configured to emit a delayed controlling stream of data, wherein the full duplex transceiver amplifier assembly is configured to communicate with a plurality of full duplex transceiver assemblies, the plurality of full duplex transceiver assemblies each comprising a transceiver having a microprocessor configured to emit a stream of controlling data, wherein the microprocessor of the full duplex transceiver amplifier assembly and the microprocessors of the plurality of full duplex transceiver assemblies are each configured to emit a plurality of streams of identical controlling data, the plurality of streams of identical controlling data of the microprocessor of the full duplex transceiver amplifier assembly being different than the plurality of streams of identical controlling data of the microprocessors of the plurality of full duplex transceiver assemblies.

5. The full duplex transceiver amplifier assembly according to claim 4, wherein the microprocessor is configured to emit the delayed controlling stream of data in order to allow audio to pass between the transceiver and the amplifier without feedback, regardless of the amplification level and the proximity of the microphone to the speaker.

6. The full duplex transceiver amplifier assembly according to claim 4, further comprising a channel button electrically connected to the microprocessor.

7. The full duplex transceiver amplifier assembly according to claim 4, wherein the controlling stream of data of the full duplex transceiver amplifier assembly is configured to be delayed at least 4 milliseconds by the microprocessor of the full duplex transceiver amplifier assembly.

8. The full duplex transceiver amplifier assembly according to claim 4, further comprising an automatic gain controller coupled to the housing of the full duplex transceiver amplifier assembly, and wherein, responsive to an audio level proximate one of the plurality of full duplex transceiver assemblies rising above a predetermined value, the automatic gain controller moves the full duplex transceiver amplifier assembly from a TRANSMIT state to a RECEIVE state, thereby preventing audio from passing from the full duplex transceiver amplifier assembly to the one of the plurality of full duplex transceiver assemblies.

9. A full duplex transceiver amplifier assembly comprising:
a housing;
a microphone coupled to the housing;
a printed circuit board coupled to and disposed within the housing, the printed circuit board comprising a transceiver having a microprocessor, and an amplifier; and
a speaker electrically connected to the printed circuit board, the amplifier being electrically connected to the microphone, the speaker and the transceiver,
wherein the microprocessor is configured to emit a delayed controlling stream of data, wherein the full duplex transceiver amplifier assembly is configured to communicate with a plurality of full duplex transceiver assemblies, the plurality of full duplex transceiver assemblies each comprising a transceiver having a microprocessor configured to emit a stream of controlling data, wherein the plurality of full duplex assemblies comprises a first full duplex transceiver assembly, a second full duplex transceiver assembly, and a third full duplex transceiver assembly, wherein the first, second, and third full duplex transceiver assemblies and the full duplex transceiver amplifier assembly are configured to have a plurality of sequences, wherein in a first sequence, the first full duplex transceiver assembly and the full duplex transceiver amplifier assembly are on a first physical channel, thereby allowing the users of the first full duplex transceiver assembly and the full duplex transceiver amplifier assembly to communicate on the first physical channel in full duplex, and simultaneously the second and third full duplex transceiver assemblies are on a second physical channel, thereby allowing the users of the second and third full duplex transceiver assemblies to communicate on the second physical channel in full duplex.

10. A communication system comprising:
a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver,
wherein the microprocessor is configured to emit a delayed controlling stream of data, and
a number of full duplex transceiver assemblies each configured to be worn by a different user, each of the number of full duplex transceiver assemblies comprising a housing and printed circuit board coupled to the housing, the printed circuit board comprising a transceiver having a microprocessor, each microprocessor of the number of full duplex transceiver assemblies being configured to emit a different stream of controlling data,
wherein the full duplex transceiver amplifier assembly further comprises an automatic gain controller coupled to the housing of the full duplex transceiver amplifier assembly, and wherein, responsive to an audio level proximate one of the plurality of full duplex transceiver assemblies rising above a predetermined value, the automatic gain controller moves the full duplex transceiver amplifier assembly from a TRANSMIT state to a RECEIVE state, thereby preventing audio from passing from the full duplex transceiver amplifier assembly to the one of the plurality of full duplex transceiver assemblies.

11. A communication system comprising:
a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and a speaker electrically connected to the printed circuit board, the amplifier being electrically connected to the microphone, the speaker and the transceiver, wherein the microprocessor is configured to emit a delayed controlling stream of data, and a number of full duplex transceiver assemblies each configured to be worn by a different user, each of the number of full duplex transceiver assemblies comprising a housing and printed circuit board coupled to the housing, the printed circuit board comprising a transceiver having a microprocessor, each microprocessor of the number of full duplex transceiver assemblies being configured to emit a different stream of controlling data, wherein the microprocessor of the full duplex transceiver amplifier assembly and the microprocessors of the number of full duplex transceiver assemblies are each configured to emit a plurality of streams of identical controlling data, the plurality of streams of identical controlling data of the microprocessors of the full duplex transceiver amplifier assembly and the number of full duplex transceiver assemblies being different from one another.

12. The communication system according to claim 11, wherein the microprocessor of the full duplex transceiver amplifier assembly is configured to emit the delayed controlling stream of data in order to allow audio to pass between the transceiver of the full duplex transceiver amplifier assembly and the amplifier without feedback, regardless of the amplification level and the proximity of the microphone to the speaker.

13. A communication system comprising:
a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver,
wherein the microprocessor is configured to emit a delayed controlling stream of data, and
a number of full duplex transceiver assemblies each configured to be worn by a different user, each of the number of full duplex transceiver assemblies comprising a housing and printed circuit board coupled to the housing, the printed circuit board comprising a transceiver having a microprocessor, each microprocessor of the number of full duplex transceiver assemblies being configured to emit a different stream of controlling data,
wherein the number of full duplex transceiver assemblies comprises a first full duplex transceiver assembly, a second full duplex transceiver assembly, and a third full duplex transceiver assembly, wherein the first, second, and third full duplex transceiver assemblies and the full duplex transceiver amplifier assembly are configured to have a plurality of sequences, wherein in a first sequence, the first full duplex transceiver assembly and the full duplex transceiver amplifier assembly are on a first physical channel, thereby allowing the users of the first full duplex transceiver assembly and the full duplex transceiver amplifier assembly to communicate on the first physical channel in full duplex, and simultaneously the second and third full duplex transceiver assemblies are on a second physical channel, thereby allowing the users of the second and third full duplex transceiver assemblies to communicate on the second physical channel in full duplex.

14. A method of passing audio, the method comprising the steps of:
providing a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver; and
emitting with the microprocessor a delayed controlling stream of data,
wherein, responsive to emitting with the microprocessor the delayed controlling stream of data, allowing audio to pass between the transceiver and the amplifier without feedback, regardless of the amplification level and the proximity of the microphone to the speaker, the method further comprising delaying the controlling stream of data at least 4 milliseconds by the microprocessor.

15. A method of passing audio, the method comprising the steps of:
providing a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver; and
emitting with the microprocessor a delayed controlling stream of data,
wherein, responsive to emitting with the microprocessor the delayed controlling stream of data, allowing audio to pass between the transceiver and the amplifier without feedback, regardless of the amplification level and the proximity of the microphone to the speaker, the method further comprising:
occupying with the full duplex transceiver amplifier assembly a first physical frequency for less than 5 milliseconds;
hopping the full duplex transceiver amplifier assembly to a second physical frequency different than the first physical frequency;
occupying with the full duplex transceiver amplifier assembly the second physical frequency for less than 5 milliseconds; and
hopping the full duplex transceiver amplifier assembly to a third physical frequency different than the second frequency.

16. The method according to claim 15, further comprising:
communicating with the full duplex transceiver amplifier assembly a plurality of full duplex transceiver assemblies; and providing each of the plurality of full duplex transceiver assemblies with a transceiver having a microprocessor configured to emit a stream of controlling data.

17. The method according to claim 15, wherein the delayed controlling stream of data of the full duplex transceiver amplifier assembly is configured to be delayed at least 4 milliseconds by the microprocessor.

18. A method of passing audio, the method comprising the steps of:
providing a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver;
emitting with the microprocessor a delayed controlling stream of data,
wherein, responsive to emitting with the microprocessor the delayed controlling stream of data, allowing audio to pass between the transceiver and the amplifier without feedback, regardless of the amplification level and the proximity of the microphone to the speaker, the method further comprising:
communicating with the full duplex transceiver amplifier assembly a plurality of full duplex transceiver assemblies;
providing each of the plurality of full duplex transceiver assemblies with a transceiver having a microprocessor configured to emit a stream of controlling data; and
emitting with the microprocessor of the full duplex transceiver amplifier assembly and the microprocessors of the plurality of full duplex transceiver assemblies a plurality of streams of identical controlling data, the plurality of streams of identical controlling data of the microprocessor of the full duplex transceiver amplifier assembly being different than the plurality of streams of identical controlling data of the microprocessors of the plurality of full duplex transceiver assemblies.

19. The method according to claim 18, wherein the plurality of full duplex transceiver assemblies comprises a first full duplex transceiver assembly, a second full duplex transceiver assembly, and a third full duplex transceiver assembly, wherein the first, second, and third full duplex transceiver assemblies and the full duplex transceiver amplifier assembly are configured to have a plurality of sequences, wherein in a first sequence, the first full duplex transceiver assembly and the full duplex transceiver amplifier assembly are on a first physical channel, thereby allowing the users of the first full duplex transceiver assembly and the full duplex transceiver amplifier assembly to communicate on the first physical channel in full duplex, and simultaneously the second and third full duplex transceiver assemblies are on a second physical channel, thereby allowing the users of the second and third full duplex transceiver assemblies to communicate on the second physical channel in full duplex.

20. A method of passing audio, the method comprising the steps of:
providing a full duplex transceiver amplifier assembly comprising:
a housing,
a microphone coupled to the housing,
a printed circuit board coupled to and disposed within the housing, the printed circuit board comprising a transceiver having a microprocessor, and an amplifier, and
a speaker electrically connected to the printed circuit board, the amplifier being electrically connected to the microphone, the speaker and the transceiver;
emitting with the microprocessor a delayed controlling stream of data,
wherein, responsive to emitting with the microprocessor the delayed controlling stream of data, allowing audio to pass between the transceiver and the amplifier without feedback, regardless of the amplification level and the proximity of the microphone to the speaker, the method further comprising:
communicating with the full duplex transceiver amplifier assembly a plurality of full duplex transceiver assemblies;
providing each of the plurality of full duplex transceiver assemblies with a transceiver having a microprocessor configured to emit a stream of controlling data,
wherein the full duplex transceiver amplifier assembly further comprises an automatic gain controller coupled to the housing of the full duplex transceiver amplifier assembly, the method further comprising:
responsive to an audio level proximate one of the plurality of full duplex transceiver assemblies rising above a predetermined value, moving the full duplex transceiver amplifier assembly from a TRANSMIT state to a RECEIVE state with the automatic gain controller, thereby preventing audio from passing from the full duplex transceiver amplifier assembly to the one of the plurality of full duplex transceiver assemblies.

* * * * *